UNITED STATES PATENT OFFICE 2,534,625

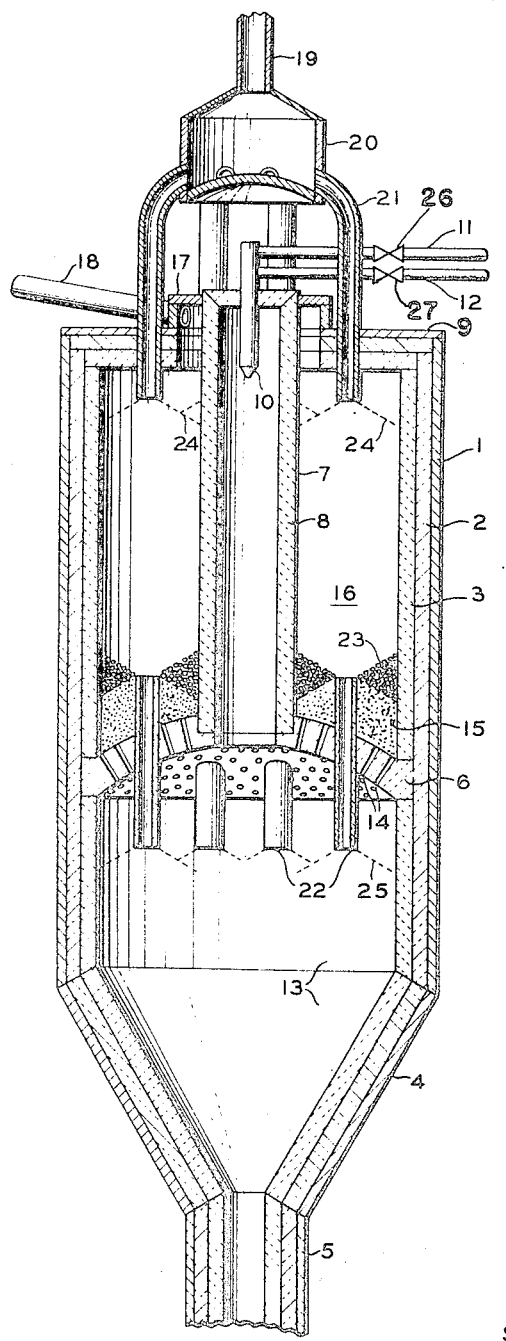

PEBBLE HEATING CHAMBER

Sam P. Robinson, Bartlesville, Okla., assignor to Phillips Petroleum Company, a corporation of Delaware Application May 10, 1948, Serial No. 26,145

12 Claims. (Cl. 263—19)

This invention relates to an improved apparatus for heating pebbles.

Many processes used in industry today, particularly those wherein the constituents are gaseous, require high temperatures to enable them to operate at maximum efficiency or to be operable at all. Several different types of apparatus have been used with varying success. One particular type highly suited to heating gases to such temperatures as 2000 to 3000° F. or of course, to lower temperatures, is the pebble heater. Generally, this apparatus is constructed primarily of refractory bricks contained within an outer metal shell. The construction is such that a contiguous mass of pebbles may be passed through and exposed to hot gases. The design is made so that the pebbles will pass through the heater in an even flow, that is, the pebbles at the side of the chamber pass through at the same rate as those toward the center, so the pebbles will be evenly heated. Some of the processes which may utilize pebble heaters to particular advantage, to name just a few, are cracking of hydrocarbons, synthesis gas ($H_2$ plus $CO$) generation, and super-heating of steam.

In most processes using pebble heaters, the pebbles are first heated in a conventional heater and then passed by gravity, utilizing suitable control apparatus, to a reaction chamber situated below the heater. The material or materials to be heated are introduced to this chamber under suitable pressure conditions so that there will be no flow of hot gases from the heater to the reaction chamber, and only a slight flow of reactants into the heater. By so controlling the pressure, the materials within the reaction chamber remain uncontaminated. The speed at which pebbles flow in a contiguous mass through the heater and the reaction chamber is controlled to give the desired temperature within the reaction chamber.

The term "pebbles" as used herein refers to refractory elements which are employed herein as a fluent particulate mass. These pebbles are preferably substantially spherical and relatively uniform in size, but may be rod shaped or irregular in shape or size. Spheres of about ⅛ inch to 1 inch in diameter are suitable and those of ¼ inch to ½ inch are preferred. Care must be taken to select pebbles of proper composition for a given process. In cracking organic materials at elevated temperatures, pebbles of highly refractory character and ruggedness must be utilized. In conducting endothermic reactions at elevated temperatures, it is important to operate with pebbles of relatively high specific heat in order to introduce sufficient heat to the conversion chamber with a minimum flow of pebbles. Pure alumina pebbles fired at temperatures between 3000 and 3500° F. are suitable for many hydrocarbon conversion processes. Pebbles comprising beryllia, silicon carbide, mullite, periclase, and zirconia make excellent contact materials for some processes. Pebbles of the materials above named may be impregnated with other materials which are catalytic, but this treatment usually renders them less suitable at extremely high temperatures such as 2500° F. and higher. Metal balls such as nickel, Monel, inconel, iron, copper, etc., have utility in specific processes. Various adsorbent materials such as silica gel, active aluminas, activated carbon, etc., have wide utility in gas treatment and adsorption.

An object of this invention is to provide an apparatus for contacting gases and solids in countercurrent flow which permits substantially uniform contact time throughout the bed of solids.

Another object of this invention is to provide a gas-solid contact chamber in which the hot gases are generated therein.

Another object of the invention is to provide apparatus for contacting gases and pebbles which assures substantially even distribution of gases throughout the mass of pebbles.

Another object is to provide apparatus for contacting gases and pebbles which includes a tempering bed to insure a more even temperature throughout the mass of pebbles.

Another object is to provide an apparatus for uniformly heating a mass of pebbles in which is located a hot gas generating chamber comprised of ceramic material without metal supports.

Another object of this invention is to provide apparatus for utilizing a minimum of heat to heat a mass of pebbles.

Further objects and advantages of this invention will be apparent from the accompanying disclosure and discussion.

In accordance with this invention, pebbles to be heated are passed from a reservoir through a plurality of evenly spaced inlet means into the top of an annular space formed between the walls of the pebble heater and a heat-generating chamber which is axially positioned within the pebble heater. The heat generating chamber is positioned such that the pebbles within the annular space are heated by radiation and conduction in addition to hot gases, thus conserving heat to a maximum. The pebbles which are introduced into the annular space so that an even contiguous mass is formed, pass downwardly through said space. The axially positioned heat-generating chamber and also the mass of pebbles are supported by a transverse dome extending upwardly and inwardly and supported at its periphery by the outer shell or wall of the pebble heater. Through this dome are extended ceramic tubes through which the pebbles are allowed to pass to the frusto-conical lower portion of the heater. These tubes, by extending through and below the dome, allow a gas space between the dome and the pebble bed which is formed below. This bed which comprises a contiguous mass of pebbles forms a tempering zone wherein the pebbles remain a sufficient time for the temperature to become relatively even throughout the bed. Sufficient heat is obtained from the hot gases from the heat-generating chamber contacting the top of the tempering bed and radiating therethrough to maintain the pebbles at about the temperature to which they have been heated. From the tempering bed the pebbles are allowed to flow through a pebble throat at the bottom thereof to be used as desired. Either hot gases or fuel and air are introduced at the top of the heat-generating chamber. In the event fuel and air are introduced, they are burned to produce the hot gases which pass downwardly through the heat-generating chamber which acts as a combustion chamber. These gases pass out the open lower end into the gas space formed by the dome and the tempering bed. From here they pass upwardly through a plurality of perforations in the dome, through a porous packing on the top of the dome, and into the annular space where they heat the downflowing pebbles. The gases, after imparting their heat to the pebbles, are passed out through suitable exhaust means at the top of the pebble heater.

A further understanding of some of the many aspects of my invention may be had by referring to the accompanying drawing, which is a vertical cross-section, in conjunction with the following discussion.

In the drawing, numeral 1 indicates a cylindrical metal outer shell forming the outer structure of the pebble heater. Numerals 2 and 3 are layers of ceramic brick, laid against the metal shell and supported by same. The brick layer 2 is composed of insulating brick used so that as much heat may be retained within the heating chamber as possible. The bricks making up layer 3 are refractory in nature, hard-burned, and abrasion resistant. It is this inner layer of brick with which the pebbles come in contact. The lower frusto-conical portion 4 of the pebble heater and the area extending upward to the outlets of the ceramic tubes 22, hereinafter described, provide a tempering zone 13 through which the pebbles pass in a contiguous mass and where the temperature of the pebbles becomes more uniform. The upper limit of zone 13, i. e., the top of the contiguous mass of pebbles therein is indicated by dotted lines 25. The pebbles have been left out of the drawing as a matter of clarity. The number 5 indicates the pebble throat through which the pebbles pass on leaving the tempering zone.

Reference numeral 6 indicates a dome of hard burned brick supported at its periphery by the wall of the pebble heater. Axially positioned heat generating chamber 7 extends downwardly from the top of the pebble heater and terminates in a freely open lower end supported by dome 6. This chamber is composed of heat-resistant abrasion-resistant brick 8. Dome 6 has a centrally located opening corresponding with that of the heat-generating chamber. Chamber 7 and the wall of the heater form annular space 16 of substantially uniform width. In the upper end of chamber 7, which extends through the top 9 of the pebble heater, is located burner 10. Pipes 11 and 12 are used for introducing air and fuel to burner 10 for combustion within chamber 7. Valves 26 and 27 in lines 11 and 12, respectively, are provided for controlling the flow of combustible material and air into chamber 7. Hot gases from chamber 7 pass downwardly through the freely open end thereof, through the centrally located opening in dome 6 and into a gas space formed by the under side of said dome and the top of the pebble bed in tempering zone 13. From the gas space, the hot gases pass upwardly through openings 14 in dome 6, porous packing 15, and into annular space 16. From the annular space where the pebbles are heated, the gases are passed through manifold 17 and out through exhaust 18.

Pebbles to be heated are introduced through pipe 19 which may be connected to a suitable lifting means for recycling pebbles. Chamber 20 is a pebble reservoir, the bottom of which is in the shape of a dome, shaped in this manner so that pebbles will be directed toward the periphery thereof. Hollow members 21 are pebble transfer means for passing pebbles from reservoir 20 through the top of the pebble heater and into annular space 16 forming a contiguous mass therein. Dotted lines 24 indicate the top of this contiguous mass of pebbles which has been left out of the drawing for clarity. A sufficient number of pebble transfer means are present to provide a relatively uniform bed of pebbles in the annular space. The pebbles pass downwardly through said annular space and through ceramic tubes 22 mentioned hereinabove to tempering zone 13. Numeral 23 indicates stagnant pebbles resting on porous packing 15.

Advantages of my invention include: simple structure which insures good pebble flow patterns, high ratio of effective pebble bed depth to diameter, cheap and efficient means for supplying hot gas, high thermal efficiency, and uniform pebble heating and pebble temperature.

Although this apparatus has been described in terms of its preferred modifications, it is understood that various changes may be made without departing from the spirit and scope of the disclosure and of the claims.

I claim:

1. An apparatus for heating a downwardly flowing contiguous mass of pebbles, which comprises a vertical shell, an axially positioned heat-generating chamber extending downwardly from the top of said shell and terminating in a freely open lower end at a point within said shell above the bottom thereof, said chamber and said shell forming an annular space of substantially uniform width for containing a downwardly flowing contiguous mass of pebbles to be heated, a perforated dome defining the upper surface of a gas space, supported at its periphery by said shell and extending inwardly and upwardly to the said open end of said heat generating chamber supporting same and said mass of pebbles, said dome having an opening at the center thereof corresponding with said freely open lower end of said chamber and having a plurality of perforations to allow upward flow of gas therethrough from said gas space into said annular space, inlet means for introducing pebbles into the top of said annular space, outlet means for removing heated pebbles from the bottom of said annular space, and gas outlet means leading from the top of said shell whereby hot gases pass upwardly through the aforesaid perforations in said dome and through said annular space to heat said pebbles therein and thence into said gas outlet means.

2. In an apparatus according to claim 1, means for generating hot gases by combustion within said heat generating chamber, said means including inlet conduits for fuel and air.

3. In an apparatus according to claim 1, means for maintaining a bed of heated pebbles in the bottom of said shell sufficiently below said dome to form a gas space between the top of said pebble bed and the bottom surface of said dome.

4. An apparatus according to claim 3, wherein said outlet means for said heated pebbles extends through and below said perforated dome into said gas space whereby heated pebbles are passed downwardly from said annular space to form a pebble bed in the bottom of said shell, immediately below said outlet means.

5. An apparatus for heating a downwardly flowing contiguous mass of pebbles, which comprises a vertical shell, an axially positioned heat-generating chamber extending downwardly from the top of said shell and terminating in a freely open lower end at a point within said shell above the bottom thereof, said chamber and said shell forming an annular space of substantially uniform width for containing a downwardly flowing contiguous mass of pebbles to be heated, a perforated dome defining the upper surface of a gas space, supported at its periphery by said shell and extending inwardly and upwardly to the said open end of said heat generating chamber supporting same and said mass of pebbles, said dome having an opening at the center thereof corresponding with said freely open lower end of said chamber and having a plurality of perforations to allow upward flow of gas therethrough from said gas space into said annular space, a plurality of evenly spaced inlet means for introducing pebbles into the top of said annular space so arranged as to form an even contiguous mass of pebbles within said annular space of uniform bed depth, a plurality of evenly spaced outlet means for removing said heated pebbles from the bottom of said annular space extending through and below said perforated dome into said gas space, said inlet and outlet means being adapted to effect uniform flow of a contiguous mass of pebbles downward through said annular space, gas outlet means leading from the top of said annular space whereby hot gases pass upwardly through the aforesaid perforations in said dome and through said annular space to heat said pebbles therein and thence into said gas outlet means, and means for maintaining a bed of heated pebbles in the bottom of said shell sufficiently below said dome to form a gas space between the top of said pebble bed and the bottom surface of said dome.

6. An apparatus according to claim 5 wherein said axially positioned heat-generating chamber extends through and above the top of said vertical shell.

7. In an apparatus according to claim 6, receptacle means for pebbles to be passed to said annular space, said means comprising an axially positioned enclosed chamber located above said heat-generating chamber and connected with said annular space by said pebble inlet means.

8. An apparatus for heating a downwardly flowing contiguous mass of pebbles, which comprises a vertical cylindrical shell, an axially positioned combustion chamber extending downwardly through the top of said shell and terminating in a freely open end at a point within said shell above the bottom thereof, said chamber and said shell forming an annular space of substantially uniform width for containing a downwardly flowing contiguous mass of pebbles to be heated, means for introducing and regulating the flow of combustible material and air into the top of said combustion chamber, a perforated dome defining the upper surface of a gas space, supported at its periphery by said shell and extending inwardly and upwardly to the said open end of said combustion chamber supporting same and said mass of pebbles, said dome having an opening at the center thereof corresponding with said freely open lower end of said chamber and having a plurality of perforations to allow upward flow of gas therethrough from said gas space into said annular space, a plurality of inlet means spaced evenly about the vertical axis of said shell for introducing and distributing pebbles into the top of said annular space, so arranged as to form a uniform and even contiguous mass of pebbles of uniform bed depth, a plurality of outlet means evenly spaced about the vertical axis of said shell for removing said heated pebbles from the bottom of said annular space extending through and below said perforated dome into said gas space, said inlet and outlet means being adapted to effect uniform flow of a contiguous mass of pebbles downwardly through said annular space, means for effecting combustion within said combustion chamber and causing flow of resulting hot gases through said combustion chamber and out said freely open end thereof into said gas space, means leading from the top of said annular space and through the top of said shell whereby said hot gases pass upwardly from said gas space through the aforesaid perforations in said dome and through said annular space to heat said pebbles therein and are removed therefrom, means for maintaining a bed of heated pebbles in the bottom of said shell for a sufficient length of time to allow equalization of temperature within said mass of pebbles, said bed of pebbles being sufficiently below said dome to form said gas space therebetween and means located at the bottom of said vertical shell for removing a contiguous mass of heated pebbles.

9. In an apparatus according to claim 8, an annular ring surrounding the protruding top portion of said combustion chamber connected with said annular space, which comprises said means for removing said hot gases from the top of said annular space, and outlet means for withdrawing hot gases from the top of said annular space through said ring.

10. An apparatus according to claim 9 wherein said dome, said combustion chamber, and the inner portion of said shell are constructed of refractories.

11. An apparatus according to claim 10 wherein the bottom of said vertical shell is in the shape of an inverted frustum of a cone.

12. In an apparatus according to claim 8, an annular ring surrounding the protruding top portion of said combustion chamber connected with said annular space, which comprises said means for removing said hot gases from the top of said annular space, outlet means for withdrawing said hot gas from the top of said annular space through said ring, said means for removing pebbles from the bottom of said vertical shell comprising a single conduit axially positioned with respect to said shell, and wherein said dome, said combustion chamber, and the inner portion of said shell are constructed of refractories.

SAM P. ROBINSON.

REFERENCES CITED

The following references are of record in the file of this patent:

UNITED STATES PATENTS

| Number | Name | Date |
|---|---|---|
| 2,445,554 | Bergstrom | July 20, 1948 |
| 2,446,805 | Bergstrom | Aug. 10, 1948 |

FOREIGN PATENTS

| Number | Country | Date |
|---|---|---|
| 828,944 | France | Mar. 7, 1938 |